United States Patent [19]
Watzlawick et al.

[11] Patent Number: 5,833,305
[45] Date of Patent: Nov. 10, 1998

[54] WIND DEFLECTOR ELEMENT FOR A MOTOR VEHICLE ROOF

[75] Inventors: Robert Watzlawick, München; Karin Entenmann, Planegg; Martin Grussler, Wildsteig, all of Germany

[73] Assignee: Webasto Karosseriesysteme GmbH, Stockdorf, Germany

[21] Appl. No.: 775,103

[22] Filed: Dec. 30, 1996

[30] Foreign Application Priority Data

Dec. 30, 1995 [DE] Germany ............... 195 49 200.5

[51] Int. Cl.⁶ ............................................. B60J 7/22
[52] U.S. Cl. ................................. 296/217; 454/129
[58] Field of Search ............... 296/217; 454/128, 454/129, 136

[56] References Cited

U.S. PATENT DOCUMENTS

| | | | |
|---|---|---|---|
| 2,337,632 | 12/1943 | Winsar | 296/217 X |
| 2,964,352 | 12/1960 | Werner | 296/217 X |
| 4,393,754 | 7/1983 | Hough et al. | 296/217 X |
| 4,482,183 | 11/1984 | Grimm et al. | 296/217 |
| 4,630,859 | 12/1986 | Bienert et al. | 296/217 |
| 4,662,671 | 5/1987 | Davis | 296/217 |
| 4,705,316 | 11/1987 | Jardin et al. | 296/217 |
| 4,844,538 | 7/1989 | Ricks | 454/129 X |
| 5,018,782 | 5/1991 | Fiegel et al. | 296/217 |

FOREIGN PATENT DOCUMENTS

| | | | |
|---|---|---|---|
| 0 362 028 | 4/1990 | European Pat. Off. . | |
| 0 421 115 | 4/1991 | European Pat. Off. . | |
| 0 491 418 | 6/1992 | European Pat. Off. . | |
| 1112553 | 3/1956 | France | 296/217 |
| 1 442 778 | 5/1966 | France | 296/217 |
| 28 32 341 C2 | 9/1982 | Germany . | |
| 39 24 036 C1 | 10/1990 | Germany . | |
| 39 22 874 C2 | 10/1992 | Germany . | |

*Primary Examiner*—Dennis H. Pedder
*Attorney, Agent, or Firm*—Sixbey, Friedman, Leedom & Ferguson; David S. Safran

[57] ABSTRACT

A wind deflector element for a motor vehicle roof (1) having a closable roof opening (5) and a wind deflector blade (7) which is located along the front edge of roof opening (5). The wind deflector blade is pivotable around an axis which is transverse to the longitudinal axis of the vehicle, and when the roof opening (5) is closed, is located either below the roof level or acts on the roof level as a cover for at least part of the roof opening (5). An adjustment device is provided for the wind deflector blade (7) with which it can be moved into a position in which air passing over it is routed upward and with which the deflector blade (7) can also be moved into a position in which at least some of the air passing over the blade is routed downward into the vehicle.

24 Claims, 7 Drawing Sheets

WIND DEFLECTOR ELEMENT FOR A MOTOR VEHICLE ROOF

BACKGROUND OF THE INVENTION

1. Field of the Invention

The invention relates to a wind deflector element for a motor vehicle roof having a closable roof opening with a wind deflector blade which is located along the front edge of the roof opening, which can be pivoted around an axis which is transverse to the longitudinal axis of the vehicle, and which, when the roof opening is closed, is located below the roof level or acts on the roof level as a cover for at least a part of the roof opening, and with an displacement mechanism for the wind deflector blade with which it can be moved into a position in which the incoming air is routed upward.

2. Description of Related Art

Wind deflector elements of the general type to which the present invention is directed are known, for example, from German Patent Nos. 39 22 874 and 39 24 036. In the arrangement known from German Patent 39 22 874, the opening and closing motion of a cover causes automatic raising or retraction of a wind deflector blade located on the front edge of the roof opening. In the raised position of the wind deflector blade, its rear edge is above the roof level and the front edge of the wind deflector blade so that incoming air, in the area of the front edge of the roof opening, is guided upward toward the rear edge of the wind deflector blade; this, on the one hand, prevents direct incoming air flow onto the vehicle occupants and on the other hand reduces the amount of noise generated by the incoming air. In the arrangement known from DE-PS-39 24 036 the wind deflector element is made as an air evacuation flap which in the closed position completely closes the roof opening and which can be swivelled around the front edge into an air evacuation position in which the rear edge of the air evacuation flap is raised so that air can be evacuated from the vehicle. In doing so direct incident air flow on the passengers can, likewise, be similarly prevented and the noise generated by the incoming air is reduced.

Both functions are important mainly at higher vehicle speeds. In the range of lower vehicle speeds, for example, in city traffic, however, it would be desirable in hot weather to route outside air in larger amounts into the vehicle interior via the roof opening.

German Patent 28 32 341 discloses a wind deflector in the form of a fixed roof attachment which is arched to the rear, which is securely attached in the front area of a roof opening, and which can pivot around an axis in the longitudinal center of the flap. The flap extends over part of the length of the roof attachment and is located above the roof level. The flap can be manually pivoted via a handle such that the incoming air is routed down into the vehicle interior. The strength of the ventilation flow, in this case, depends on the flap position. However, the flap is not provided for air deflection upward. The fixed roof attachment is designed to serve this purpose. One major defect of the arrangement known from German Patent 28 32 341 consists in the fixed attachment of the roof attachment on the vehicle roof. In doing so, the roof attachment causes permanently increased air resistance and thus permanently increased fuel consumption of the vehicle. Furthermore, the roof surface under the stationary roof attachment can be only poorly cleaned. In particular, in automatic car washes problems can arise. Furthermore, the fixed roof attachment can produce a considerable adverse aesthetic effect which occurs even with the vehicle roof closed, therefore, for most of the time the vehicle is in use.

SUMMARY OF THE INVENTION

A primary object of this invention is to devise a wind deflector element for vehicle roofs which enables both deflection of the incoming air upward and also active air delivery to the passenger compartment via the roof opening.

It is a further object to obtain the foregoing object in a manner that, with the roof opening closed, a minimum possible adverse effect is produced with respect to vehicle properties, especially with respect to air resistance, ease of cleaning, and aesthetic appearance.

These objects are achieved with a wind deflector element of the initially mentioned type by designing its displacement mechanism such that the wind deflector blade can be moved into a position in which at least some of the incoming air is routed downward.

The advantageous effect of this design is that the wind deflector function, i.e., air deflection upward, and the air delivery function for the passenger compartment, i.e., air deflection downward, are easily achieved while avoiding a fixed roof attachment.

In an advantageous embodiment, it is provided here that, when the wind deflector blade is in the position in which at least some of the incoming air is routed down, the front edge of the wind deflector blade is at least partially above the roof level and above the rear edge of the wind deflector blade. In this way, the function according to the invention can be achieved with shaping of the wind deflector blade as simply as possible.

In another advantageous embodiment of the invention, there is a cover element which closes the roof opening at least in part, the cover element being designed as a wind deflector. This offers the possibility of selectively clearing a large roof opening depending, for example, on incident solar radiation and air temperature, so that the requirements of the vehicle passengers with respect to fresh air supply and light incidence can be best satisfied.

In an embodiment of the invention, it is provided that the front edge of the deflector blade is joined at two points to a scissor type linkage mechanism, and in the middle area of each lateral side, is pivotally connected to an end of a respective lifting lever; the other end of the lifting lever is pivotally connected to the roof. This embodiment allows a large amount of force to be transferred to the wind deflector blade.

In accordance with another feature of the invention, it is provided that the displacement mechanism is made as a double hinged arrangement which is connected to the front of the wind deflector blade at two points. This embodiment enables simple production and installation of the wind deflector element.

In the two embodiments, the displacement of the wind deflector blade can take place depending on the vehicle speed and/or outside temperature. This allows especially flexible adaptation of the fresh air requirement in the passenger compartment.

In another embodiment, the displacement mechanism is built such that the position of the wind deflector element is determined by the position of the cover. In this embodiment, the degree of air delivery is automatically established via the position of the cover which is selected by the passenger, by which a separate drive for the adjustment mechanism of the wind deflector element can be abandoned without the need for manual operation of the wind deflector element.

These and further objects, features and advantages of the present invention will become apparent from the following

DETAILED DESCRIPTION OF THE PREFERRED EMBODIMENT

Figure 1A:
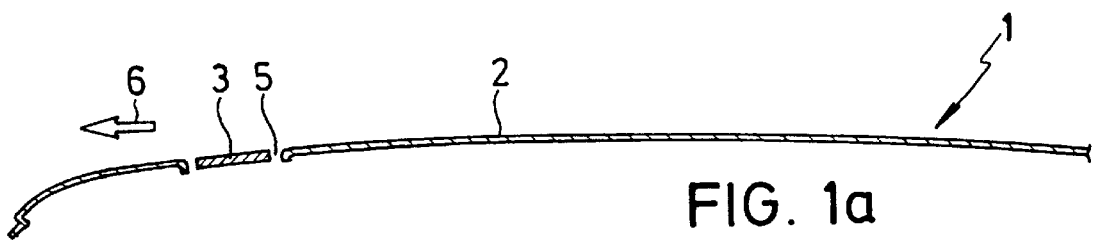
FIG. 1a through 1d show cross sectional views of a vehicle roof with different embodiments of a wind deflector element according to the invention in the closed position.

FIG. 1a through 1d schematically show different embodiments of vehicle roof 1 with a fixed roof 2, a wind deflector element 3 or 3a and a roof opening 5, which can be closed exclusively by a cover 4 (FIG. 1c and 1d), by cover 4 in conjunction with wind deflector element 3a (FIG. 1b), or exclusively by wind deflector element 3a (FIG. 1a). In the following "roof level" means the height of the top surface of fixed roof 2, and the terms "front" and "rear" relate to the forward direction of vehicle travel 6.

Figure 1B:
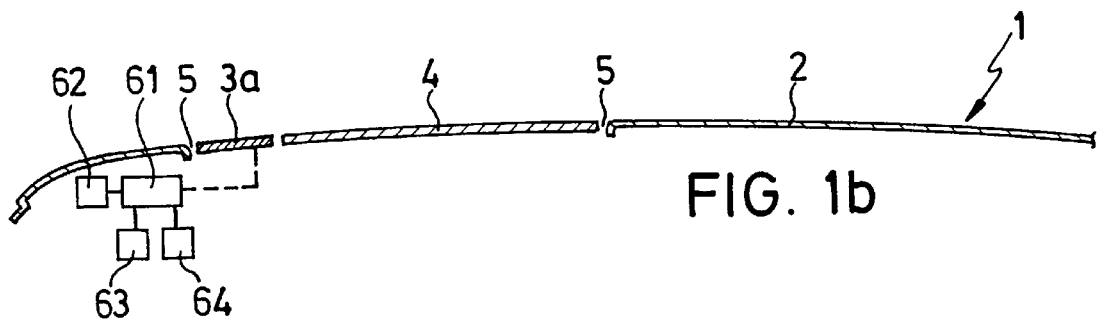
Figure 1C:
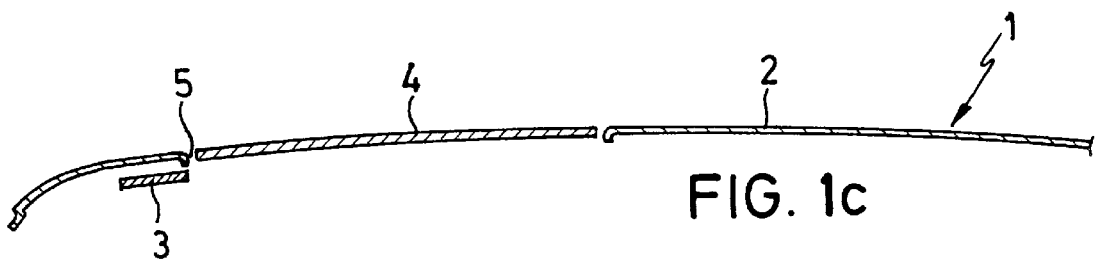
Figure 1D:
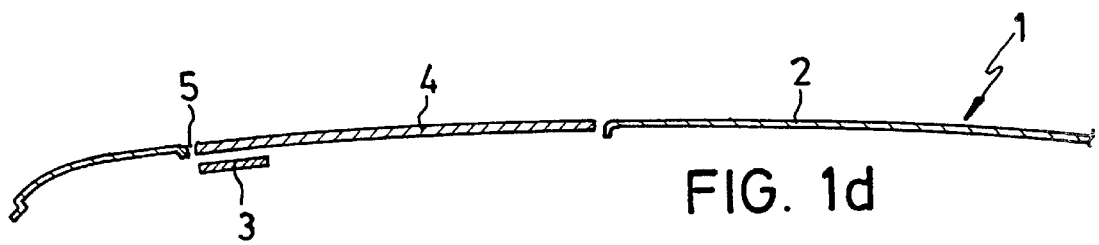

In the embodiments according to FIG. 1a and 1b, the wind deflector element 3a is made as ventilation flap. In FIG. 1a, ventilation flap 3a covers the entire roof opening so that an additional cover is lacking. In FIG. 1b, the ventilation flap 3a is located at the roof level in front of the cover 4, and in this position, assumes the function of covering the area of roof opening 5 which is not encompassed by cover 4. In the embodiments of FIG. 1c and 1d, the wind deflector element 3 is made as retractable wind deflector which is disposed below the roof level under fixed roof 2 or under cover 4 when the roof is closed. In these cases, the wind deflector element does not serve a cover function.

In the following "air evacuation positions" are positions of wind deflector 3 or ventilation flap 3a in which wind deflector 3 or ventilation flap 3a upwardly deflects air crossing the deflector element from the front toward the rear, while "air delivery positions" are the positions of wind deflector 3 or ventilation flap 3a in which air passing from the front to the rear of the deflector element is rerouted downward into the vehicle interior.

Figure 2:
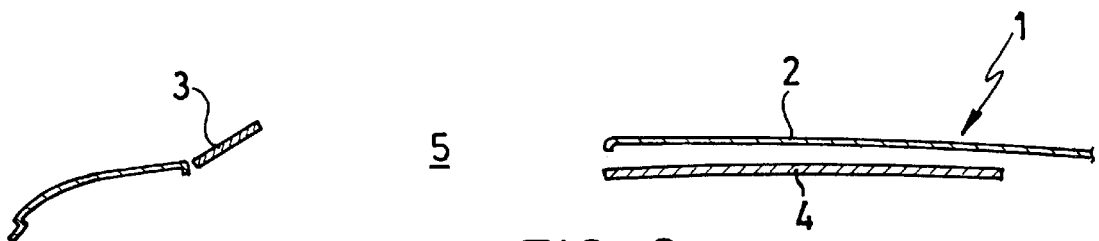
FIG. 2 shows a cross sectional view of the vehicle roof with the wind deflector element in the air evacuation position with the cover opened.

FIG. 2 schematically shows a roof cross section with cover 4 opened and with wind deflector 3 in the air evacuation position. Ventilation flap 3a is in an air evacuation position similar to the position of the wind deflector 3 shown in FIG. 2.

Figure 3A:
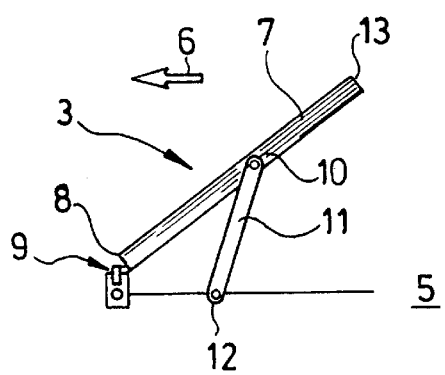
FIGS. 3a and 3b show enlarged side views of a first embodiment of a wind deflector element according to the invention in the air delivery and air evacuation position.
Figure 3B:
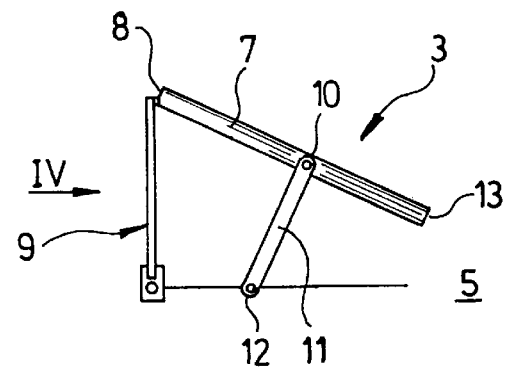

FIGS. 3a and 3b show wind deflector 3 in the air evacuation and ventilation positions, respectively. However, the illustrated arrangement is also applicable to a ventilation flap 3a. The front edge 8 of the blade 7 of the wind deflector 3 is joined to a scissor linkage arrangement 9 and a middle section of each lateral side (i.e., narrow end) of the blade 7 is pivotally connected to an end 10 of a lifting lever 11, the other end 12 of lifting lever 11 being mounted to pivot around a pivot axis that is fixed to the roof.

In the air evacuation position shown in FIG. 3a, the scissor link arrangement 9 is retracted so that front edge 8 of wind deflector blade 7 is below its rear edge 13. Conversely, in FIG. 3b, the scissor link arrangement 9 is extended so that the front edge 8 of the wind deflector blade 7 is above its rear edge 13, since the scissor link arrangement, in the extended position, reaches a greater height than lifting lever 11.

In the position shown in FIG. 3a, which is generally preferred at higher vehicle speeds, the raised rear edge 13 of wind deflector blade 7 causes the air to be deflected upward in the area of the front edge of roof opening 5 as it pass from front to rear over the wind deflector blade 7. In this way, disruptive noise which is caused by the inflow of air in the area of the front edge of roof opening 5 and which is resonantly amplified in the vehicle interior is reduced. Furthermore, direct flow onto the vehicle passengers is prevented.

In the position in FIG. 3b, which is generally preferred at lower speeds, the raised front edge 8 of wind deflector blade 7 causes the air to be routed downward into the vehicle interior as it pass from front to rear across the wind deflector blade 7 in order to provide for rapid air exchange in the vehicle interior and cooling of the vehicle interior and the vehicle passengers.

Figure 4:
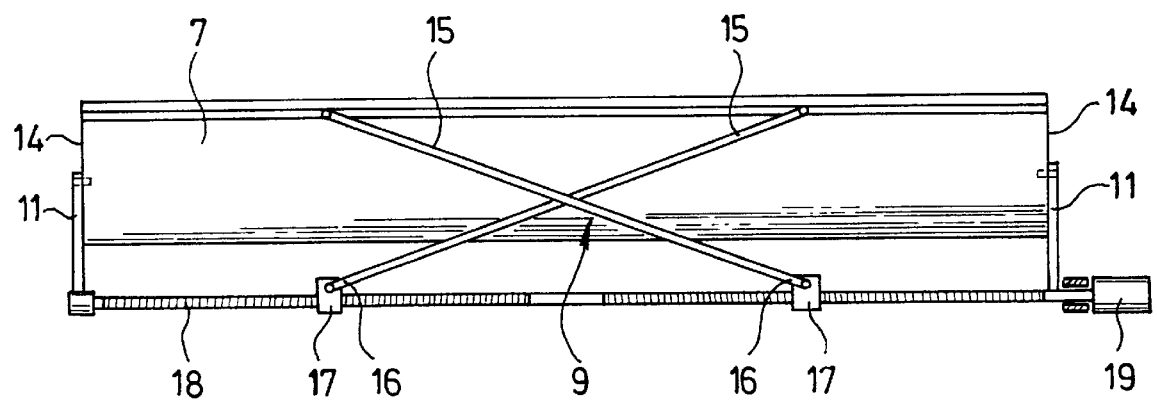
FIG. 4 shows a view of the wind deflector element of FIG. 3b as seen in the direction of the arrow IV.

FIG. 4 shows a view of wind deflector 3 or ventilation flap 3a as seen in the direction of the arrow labelled IV in FIG. 3b. From this view, it be seen that a respective lifting lever 11 is provided on each lateral side 14 of wind deflector blade 7. The scissor link arrangement 9 is located in a center section of wind deflector blade 7 and has two crossed scissor rods 15. A lower end 16 of each rod 15 is pivotally connected on a nut 17 which rides on a threaded spindle 18. The threaded spindle 18 is driven via a spindle drive 19 and extends parallel to the front edge 8 of the wind deflector blade 7. The upper end of each rod 15 is pivotally connected to the front edge 8 of wind deflector blade 7.

The threads of the two nuts 17 are cut oppositely, so that rotation of spindle 18 in one or the other direction causes movement of nuts 17 towards or away from one another. The scissor rods 15 are raised or retracted thereby, and front edge 8 of wind deflector blade 7 is raised or lowered so that it is possible to change between the air delivery and air evacuation positions by operating of the spindle drive 19.

Figure 5:
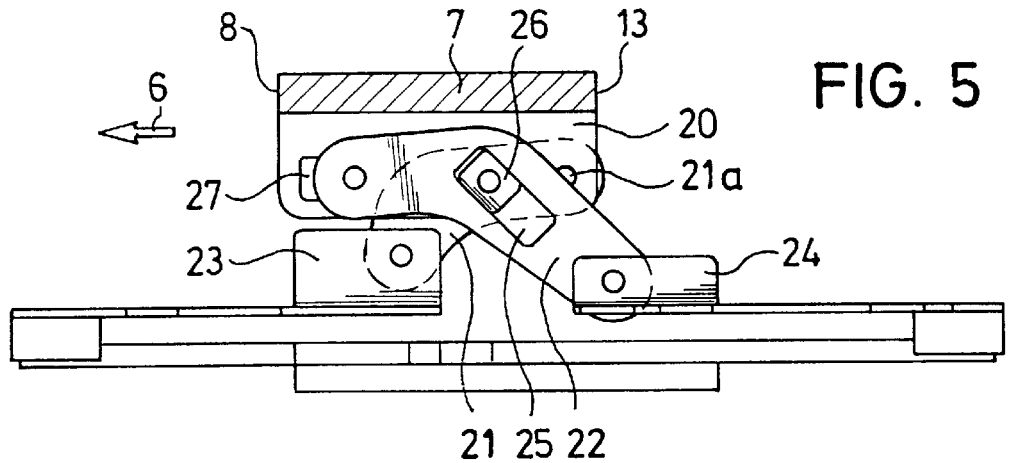
FIGS. 5 through 7 show side views of a second embodiment of a wind deflector element according to the invention in the neutral position, air delivery position and air evacuation position, respectively.
Figure 6:
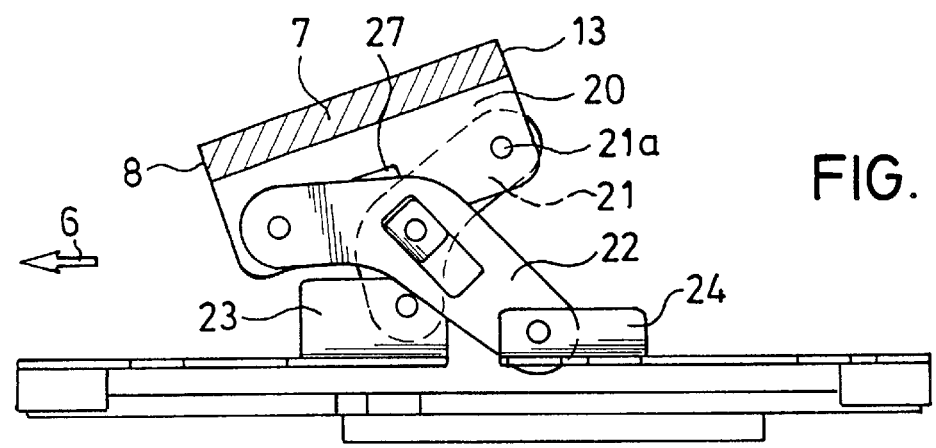
Figure 7:
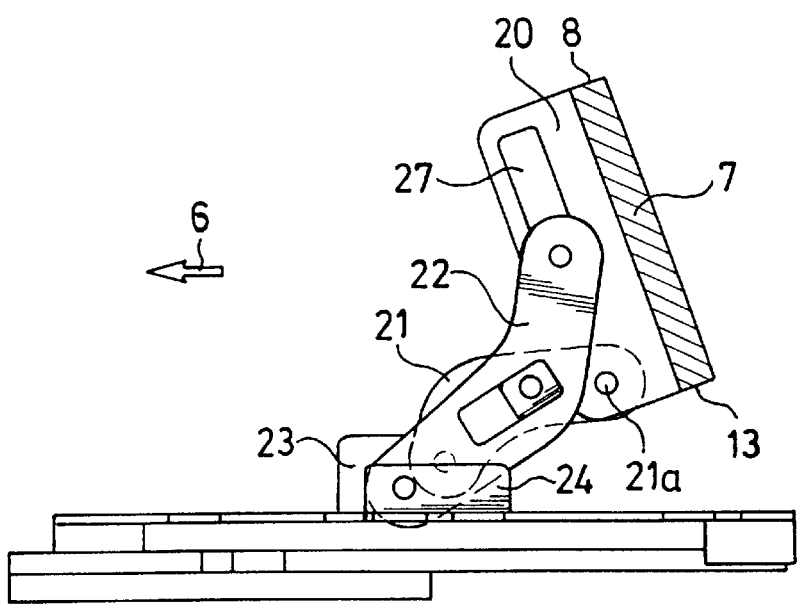

FIGS. 5 through 7 show side views of a wind deflector or a ventilation flap with wind deflector blade 7 utilizing another embodiment of the displacement mechanism. FIG. 5 shows the wind deflector in the neutral position, i.e., there is neither air delivery nor evacuation. Wind deflector blade 7 is securely joined at its lateral sides to a holder 20 to which the upper end of a lifting lever 21 is coupled to pivot around a hinge 21a. The upper end of a second lifting lever 22 is coupled to pivot and slide relative to holder 20. In this case, a slide shoe (not shown), which is attached to lever 22 to pivot about hinge pin 22a, can be moved in a slot 27 which is formed in the holder 20 in directions towards and away from the front and rear edges 8, 13 of wind deflector blade 7. In the position shown in FIG. 5, the shoe is, thus, in a middle section of slot 27. The lower ends of the lifting levers 21 and 22 are pivotally connected to base parts 23 and 24, respectively, which parts can be moved relative to one another in the longitudinal direction of the roof by means of a drive which is not shown, but which can be a cable type drive which is well known for use as a motor vehicle sunroof drive or sliding/tilting sunroofs.

In this embodiment, the base part 23 is fixed to the roof. The lifting levers 21 and 22 are joined to one another in their middle sections in a manner which permits them to slide and pivot with respect to each other by a slide shoe and pivot pin connection similar to that existing between the upper end of lever 22 and holder 20. Here, a slot 25 is formed in the lever 22, in which a slide shoe 26 which is pivotally attached to lever 21 can move. Levers 21 and 22, which are angularly shaped, cross each other in the position shown in FIG. 5. All pivot axes in FIGS. 5 through 7 are aligned parallel to one another in the transverse direction of the roof (i.e., transverse to direction of travel 6). The arrangement shown in FIGS. 5 through 7 is generally made the same on both lateral sides of the wind deflector blade 7.

FIG. 6 shows the wind deflector or ventilation flap in the air evacuation position. Base parts 23 and 24 have been moved towards one another. The shoe of lever 22 now abuts the front end of slot 27. The orientation of lever 22 is almost unchanged compared to FIG. 5. Based on the pivot connection of levers 21 and 22, lever 21 is swung up via shoe 26, so that the rear edge 13 of wind deflector blade 7 is raised.

FIG. 7 shows the wind deflector or ventilation flap in the air delivery position. Base parts 23 and 24 have been moved closer to one another than in FIG. 6. The shoe which is joined to the upper end of lever 22 abuts the rear end of slot 27. Lever 22 is now swung upward to its greatest extent, while the lever 21 is swung down relative to its position shown in FIG. 6. In this way, the front edge 8 of wind deflector blade 7 is raised up, while rear edge 13 is lowered relative to the position in FIG. 6, so that it is far below front edge 8. In this way, wind deflector blade 7 can deflect incoming air downward as it passes across it from the front, i.e., in a direction opposite travel direction 6.

Figure 8A:
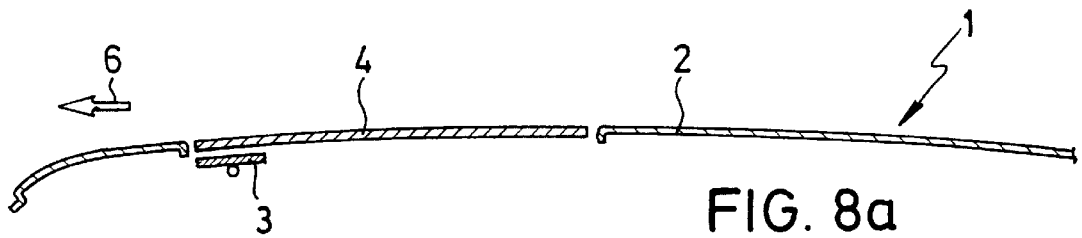
FIGS. 8a through 8d show schematic cross sectional views of one alternative embodiment of a vehicle roof with a wind deflector element according to the invention in different positions of the cover.

FIGS. 8a through 8d schematically show different operating positions of a vehicle roof with wind deflector 3 and cover 4, the position of wind deflector 3 depending on the position of cover 4. FIG. 8a shows cover 4 in the closed position with the wind deflector 3, for example, lying below cover 4 as shown. However, the wind deflector could also be in front of cover 4 under fixed roof 2 as in FIG. 1c, or it can lie in front of cover 4 in roof opening 5 as part of the roof covering in the manner shown in FIG. 1b.

Figure 8B:
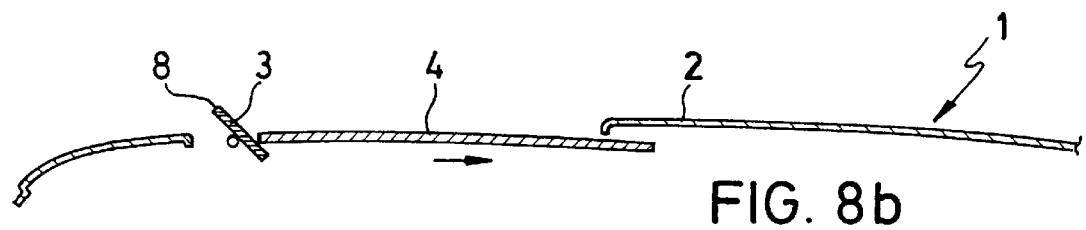

FIG. 8b shows cover 4 in a slightly partially open position. Here, the cover 4 has been pushed back slightly to the rear, i.e., opposite the direction of travel 6. Wind deflector 3 is, thus, automatically moved into an air delivery position, front edge 8 of wind deflector blade 7 being disposed above the roof level. This position is intended for fast through ventilation, i.e., routing incoming air into the vehicle interior causes a rapid exchange of the air volume located there. This is desirable primarily when the vehicle has been parked, for example, for a long time in the sun with the cover closed so that the volume of air inside the vehicle was able to heat up dramatically. If now the vehicle is started, it is desirable for the passengers that this heated air be replaced as quickly as possible by cooler ambient air. For this reason cover 4 can be moved into the partially open position shown in FIG. 8b. The resulting air delivery position of wind deflector 3 causes rapid air exchange which takes place more quickly than if, as in known systems, cover 4 is opened completely and the wind deflector moves into the fixed air evacuation position.

Figure 8C:
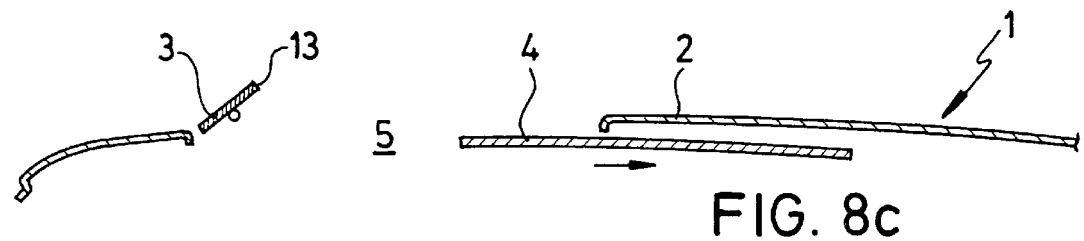

FIG. 8c shows cover 4 in a more widely opened position. Wind deflector 3 has now been automatically brought into an air evacuation position. The coupling between cover 4 and wind deflector 3 is designed such that, first of all, as the cover continues to open, the rear edge 13 of the wind deflector blade 7 of wind deflector 3 is raised farther and farther until, in a predetermined open position of cover 4, the wind deflector 3 has reached its final air evacuation position which it then retains as cover 4 continues to open. This is advantageous inasmuch as, in the air delivery phase at the start of travelling, the air in the vehicle interior is rapidly exchanged, while in normal driving, i.e., at a higher driving speed, essentially, the conventional wind deflector function, i.e., the air evacuation position, is desirable.

Figure 8D:
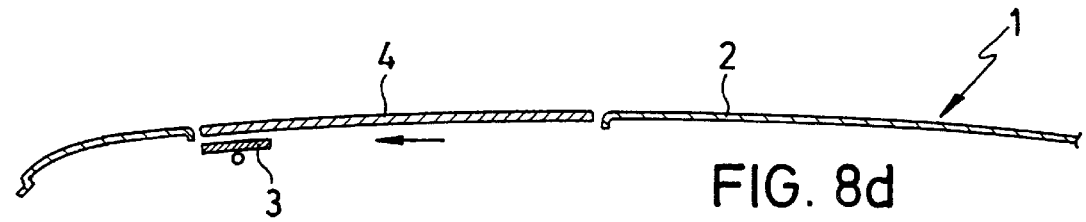

FIG. 8d shows cover 4 in the re-closed position. In the closing process of cover 4, wind deflector 3 is traversed by cover 4 and forced back into its initial position (for example, under cover 4).

Figure 9A:
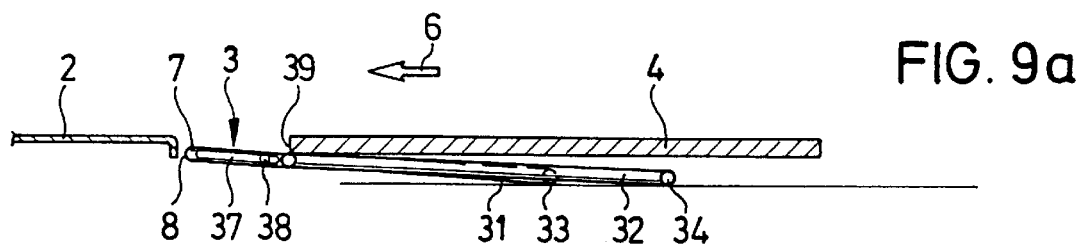
FIGS. 9a through 9e are enlarged cross sectional views depicting shifting of the wind deflector by its displacement mechanism in accordance with respective different cover positions for the embodiment of FIGS. 8a through 8d.

FIGS. 9a through 9e show in detail a displacement mechanism for wind deflector 3 which satisfies the functions described using FIGS. 8a through 8d. In FIG. 9a, cover 4 is shifted to the rear out of the closed position by a distance which corresponds roughly to the width of wind deflector plate 7.

In this example, the wind deflector plate 7 is in a flat position behind the front edge of roof opening 5. Wind deflector 3 has two raising levers 31 and 32 with rear ends 33 or 34 which are mounted to pivot around axes which are fixed to the roof at positions offset by a certain distance from one another in the longitudinal direction of the roof (driving direction 6). Lever 31 is connected to the roof at more forward position and is shorter than lever 32. The front end 36 of lever 32 is pivotally connected to the rear edge 13 of wind deflector blade 7.

Wind deflector blade 7 has a side groove 37 which runs along each lateral edge of wind deflector blade 7 and in which a shoe 38, which is pivotally connected to the front end 35 of lever 31, is movably guided. All pivot axes are oriented parallel to one another in the transverse direction of the roof. Levers 31 and 32 are pretensioned upward by springs S (which are only schematically depicted in FIGS. 9c and 9d and can be coiled leg springs on levers 31, 32, in a manner analogous to the action of such springs in the wind deflector arrangements of, e.g., U.S. Pat. Nos. 4,630,859; 4,705,316; and 5,018,782), so that front edge 39 of cover 4 acts as a stop for two levers 31 and 32. Front edge 39 of cover 4, here, is disposed a distance above the ends 33 and 34 of levers 31 and 32 which are coupled permanently to the roof.

In the position shown in FIG. 9a, a slide shoe 38 is located in the rear area of groove 37. The front edge 39 of cover 4 is in the vicinity of the front ends 35, 36 of the levers 31, 32, so that the levers 31 and 32 are aligned almost parallel to one another. It goes without saying that the levers 31 and 32 are slightly offset relative to one another in the transverse direction of the roof.

Figure 9B:
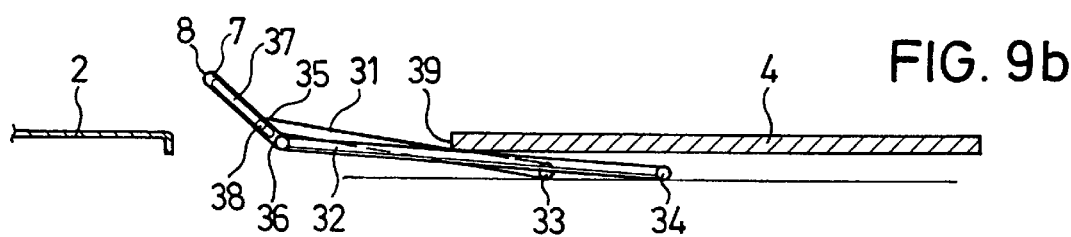

In FIG. 9b, the cover 4 has been shifted a certain distance to the rear. The front edge 39 of cover 4, here, is roughly in the middle of levers 31 and 32. The front ends 35, 36 of the levers 31, 32 are moved upward, due to the mechanical prestress, by changing the bearing points, i.e., the position of front edge 39 of cover 4 on the levers. Front end 35 of lever 31 can move farther upward than front end 36 of lever 32 since the fixed pivot axis of lever 31 on its rear end 33 is farther forward than the corresponding pivot axis of lever 32 on its rear end 34. The pivoting of lever 32 leads to lifting of rear edge 13 of wind deflector blade 7. The corresponding greater pivoting of lever 31 results in shoe 38 being shifted in groove 37 in a direction toward the front edge 8 of the wind deflector blade 7, front edge 8 of wind deflector blade 7 being raised to a greater degree than its rear edge 13, so that the front edge 8 is clearly above rear edge 13. Wind deflector blade 7 thus assumes an air delivery position.

Figure 9C:
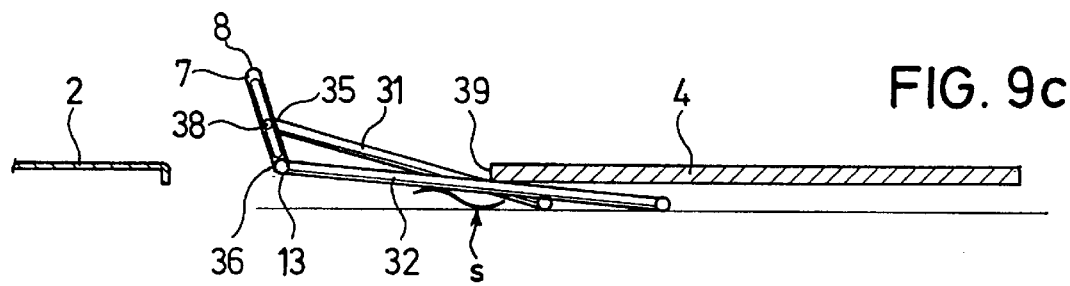

FIG. 9c shows a position of cover 4 in which it is further opened, i.e. is shifted further to the rear. The bearing point of levers 31 and 32, i.e., front edge 39 of the cover thereon, is further shifted to the rear. Levers 31 and 32 are both swung further upward than in FIG. 9b, the difference in the pivoting angles of levers 31 and 32 having increased, i.e., lever 31 is swung upward to a much greater degree than lever 32, so that wind deflector blade 7 is raised further than in FIG. 9b, its front edge 8 lying well above its rear edge, so that wind deflector blade 7 assumes a more pronounced air delivery position than in FIG. 9b. Lever 31 abuts a stop 41 (represented only in FIG. 9e), so that a further opening movement of cover 4 no longer causes additional pivoting of lever 31. The wind deflector blade in the position shown in FIG. 9c, thus, has reached its maximum air delivery position.

Figure 9D:
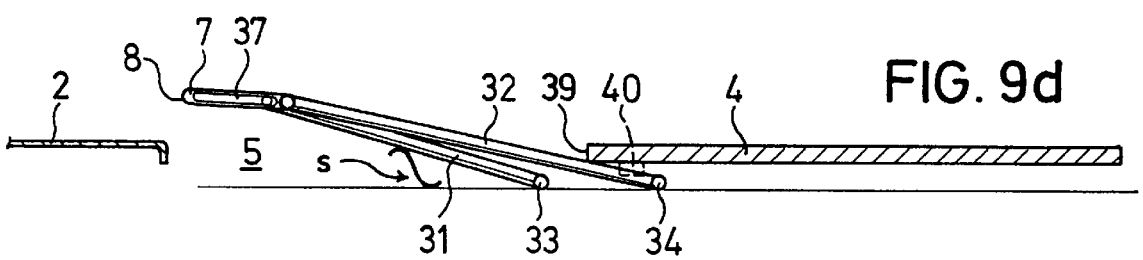

In FIG. 9d, the cover 4 is shown having been opened further. This causes additional swinging out of lever 32, while the position of lever 31 remains constant due to the noted contact with stop 41. The angles of the levers 31 and 32 thus approach one another. Rear edge 13 of the wind deflector blade 7 moves upward, while front edge 8 moves downward producing a swivelling of wind deflector blade 7 due to shoe 38 which remains in a constant position on the front end 35 of lever 31. In FIG. 9d, the wind deflector blade 7 has returned to the same flat orientation as in FIG. 9a, but is shifted upward relative to the position according to FIG. 9a, so that the wind deflector blade in this position can perform an air delivery or an air evacuation function (for example, depending on the distance from the roof edge).

Figure 9E:
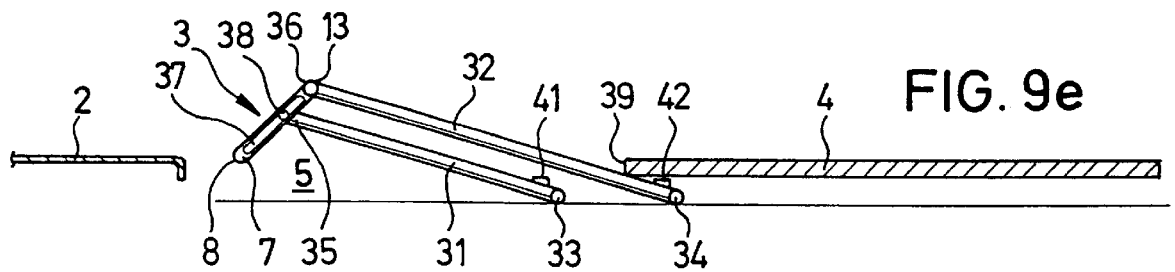

In the open position of cover 4 shown in FIG. 9e, lever 32 is pivoted upward so far that it abuts a stop 42, so that further opening motion of cover 4 no longer changes the position of wind deflector 3 or wind deflector blade 7. In the FIG. 9e position, the wind deflector blade 7 has assumed a pronounced air evacuation position in which the front edge 8 of the wind deflector blade 7 is located far below the rear edge 13. In this position, the levers 31 and 32 have a similar angular orientation, so that they are roughly parallel to one another.

When cover 4 is closed the described automatic displacement of the wind deflector blade 7 proceeds in the reverse sequence.

It goes without saying that the exact course of movement of the wind deflector 3 depends, among others, on the choice of the lengths of the levers 31 and 32, on the arrangement of their pivot axes, and on the positioning of stops 41 and 42. The arrangement shown in FIGS. 9a to 9e is formed identically on each of the lateral sides of wind deflector blade 7.

The mechanism described in FIGS. 9a through 9e is not limited to embodiments in which wind deflector blade 7 is in the closed position in front of cover 4. Rather, wind deflector blade 7 can also be positioned in front of cover 4 in roof opening 5 and perform a cover function as is sketched in FIG. 1a.

Instead of front edge 39 of the cover, part 40, which also participates in rearward movements of the cover, can be used as a stop for the upward motion of raising levers 31, 32. This part 40 is shown schematically in FIG. 9d.

The principle of coupling of wind deflector adjustment to the opening and closing motion of cover 4 is in no way limited to the mechanism shown in FIG. 9a through 9e. For example, a double hinge mechanism as in FIGS. 5 through 7 or a shear arrangement as in FIG. 3a, 3b and 4 could be used, in which for example base part 24 or spindle drive 19 is driven in coupling with the opening/closing motion of the cover.

The mechanism can be made such that the wind deflector blade is swung clockwise or counterclockwise when the cover is opened.

Figure 10:
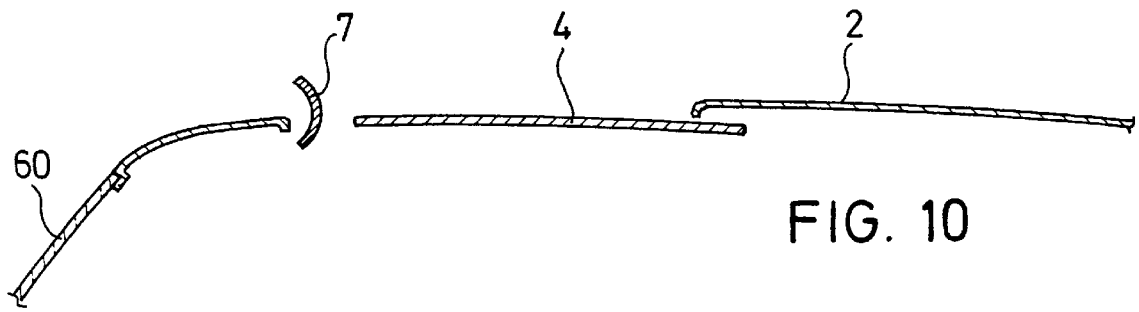
FIGS. 10 and 11 show cross sectional views of another embodiment of a wind deflector element according to the invention in an air delivery position and an air evacuation position, respectively.
Figure 11:
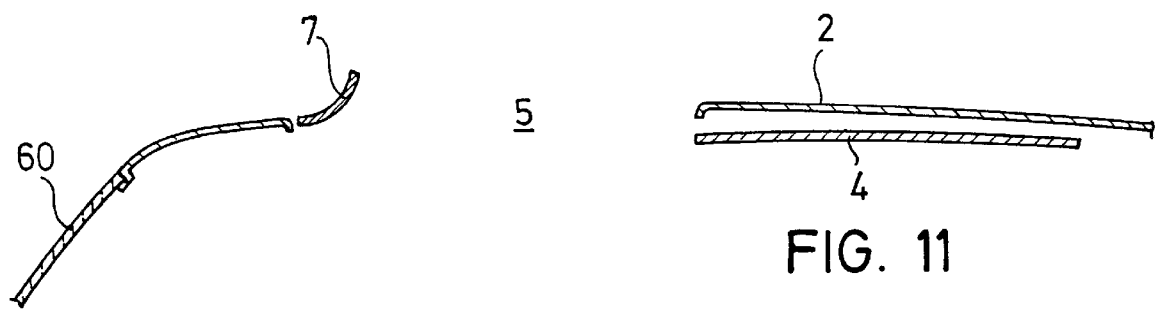

FIGS. 10 through 14 schematically show different embodiments of wind deflector blade 7. Regardless of the representation selected in the drawing, the wind deflector element can be made as a wind deflector or ventilation flap. FIGS. 10 and 11 show a wind deflector blade 7 which has a cross section which is concavely curved toward the front or top in semicircular or elliptical form. This design results in the wind deflector blade 7 being able to both deliver and evacuate air in certain positions. In particular, the curved wind deflector blade in the upright position shown in FIG. 10, in which its transversely extending, longitudinal edges project forward, as a result of the shape, can deflect the air in part upward and in part downward. This means that the vehicle interior can be actively supplied with air by means of wind deflector blade 7 via the roof opening, while wind deflector blade 7 at the same time counteracts the noise developed by the incoming air. Another advantage of this shaping is that the air is routed in the direction of front windshield 60, so that the air does not blow directly on the vehicle occupants. In the position according to FIG. 11, the wind deflector blade conversely performs only an air evacuation function.

Figure 12:
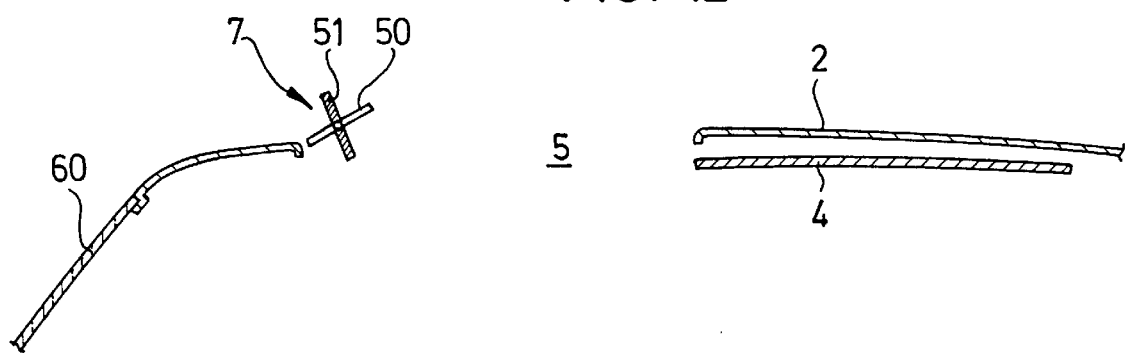
FIGS. 12 and 13 show a cross section and an overhead view, respectively, of a further modified wind deflector element.
Figure 13:
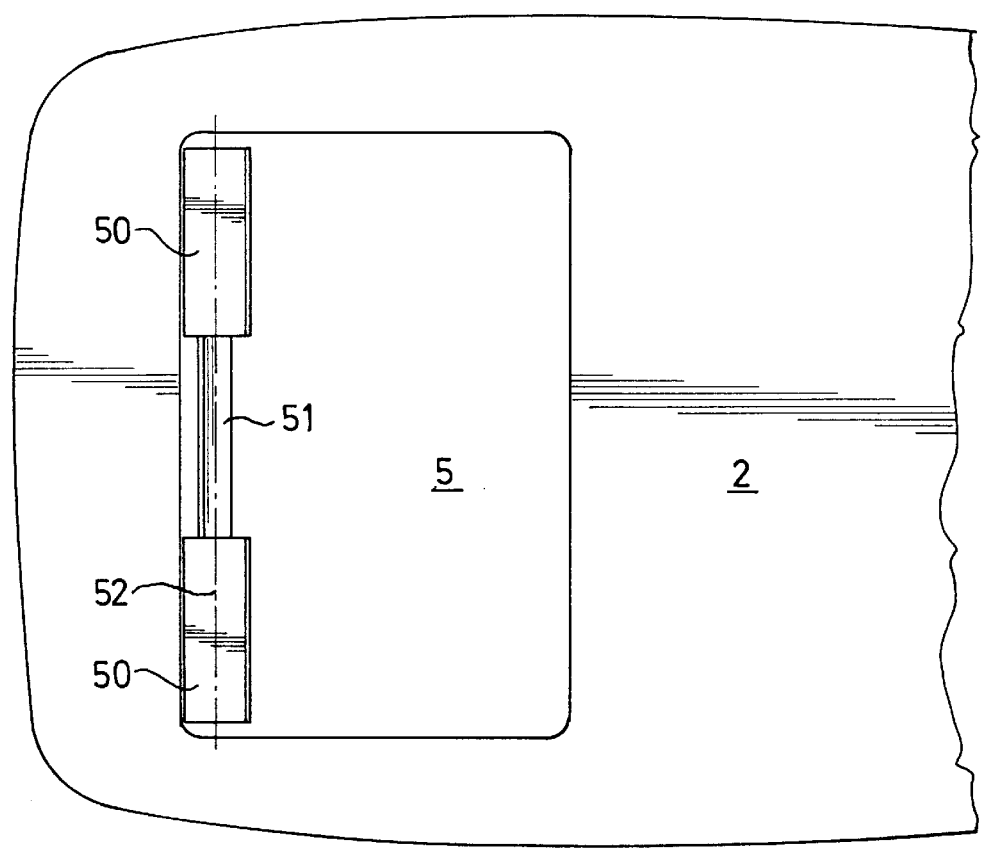

FIGS. 12 and 13 show a segmented wind deflector in cross section and in plan view, respectively. Here, the wind deflector blade 7 has two edge segments 50 which are movable into air evacuation positions and a middle segment 51 which can be position in air evacuation and air delivery positions. Edge segments 50, therefore, with the roof at least partially opened perform an air evacuation function, while middle segment 51 can provide both for air delivery and air evacuation. The adjustable middle segment 51 is pivotally connected to edge segments 50 via axis 52 which runs in the transverse direction of the roof. The adjustable segment need not be located in the center, but can also be located on the driver side or passenger side. Likewise, several adjustable segments can be provided.

Figure 14:
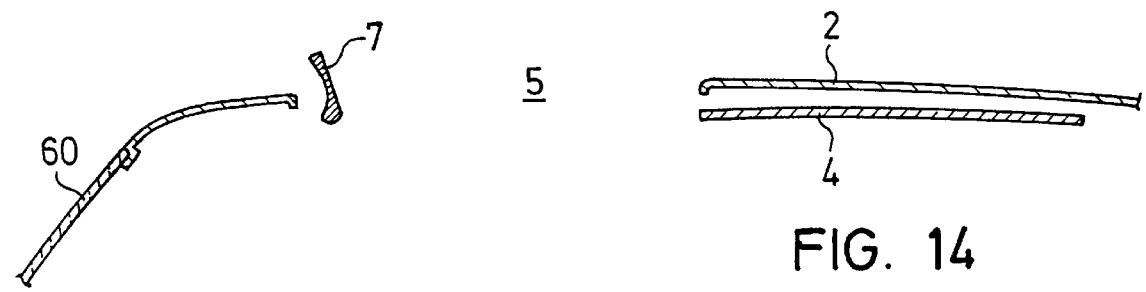
FIG. 14 is a cross sectional view of yet another embodiment of a wind deflector element according to the invention.

FIG. 14 shows a wind deflector with wind deflector blade 7 having a contoured profile on its active (front as shown) surface which is elliptical in cross section. In this case, similar to the embodiment of FIGS. 10 and 11, by shaping wind deflector blade 7, the air flowing over the deflector blade can be routed forward in the direction of front windshield 60. The wind deflector according to FIG. 14 can also be provided with one or more adjustable flaps as in the embodiment of FIGS. 12 and 13.

When wind deflector 3, as in FIG. 1a, is located in roof opening 5 in front of cover 4, and thus itself assumes a cover function, it can also be displaced, accordingly, even with cover 4 closed in order to provide for air delivery or evacuation.

So far, the wind deflector has been explained in conjunction with a sliding cover. Cover 4, however, is to be representative of all different types of coverings for a vehicle roof opening, for example, louvered roofs (multipart roofs), sliding and lifting roofs, spoiler roofs, folding roofs, etc.

The adjustment of the wind deflector or ventilation flap can take place, basically, either independently of the cover position or coupled to it. In the former case, the shifting of the wind deflector element 7 can be produced by hand, as is represented schematically in FIG. 1b, by means of a manual controlling of an electric motor 61 via, for example, a control panel 62. However, movement of the wind deflector element 7 can also take place automatically depending on the vehicle speed and/or the outside temperature in response to signals from a speed sensor 63 and/or a temperature sensor 64. Preferably, cover 4 is driven electrically.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Wind deflector element for a motor vehicle roof having a closable roof opening in a fixed roof surface comprising a wind deflector blade which is located along a front edge of the roof opening, the wind deflector blade being mounted to pivot around an axis which is transverse to a longitudinal direction of the roof, the wind deflector blade having an inactive position and a plurality of active positions, and a displacement device for the wind deflector blade for moving said wind deflector blade into and out of said inactive and active positions; wherein said active positions to which the wind deflector blade is displaceable by said displacement device comprise an evacuation position in which the wind deflector blade is oriented for guiding air passing thereover upwardly away from said roof opening in a front-to-rear direction; and an air delivery position in which the wind deflector blade is oriented for guiding air passing thereover in a downward direction into said roof opening; further comprising a cover which partially closes the roof opening in a closed position thereof; and wherein the wind deflector blade functions as a cover for a remaining portion of the roof opening in said inactive position.

2. Wind deflector element according to claim 1, wherein a front edge of the wind deflector blade is at least partially above the fixed roof surface and above a rear edge of the wind deflector blade when the wind deflector blade is in the wind delivery position.

3. Wind deflector element according to claim 1, wherein the wind deflector blade is a cover flap which closes a portion of the roof opening in said inactive position.

4. Wind deflector for a motor vehicle roof having a closable roof opening in a fixed roof surface comprising a wind deflector blade which is located along a front edge of the roof opening, the wind deflector blade being mounted to pivot around an axis which is transverse to a longitudinal direction of the roof, the wind deflector blade having an inactive position and a plurality of active positions, and a displacement device for the wind deflector blade for moving said wind deflector blade into and out of said inactive and active positions; wherein said active positions to which the wind deflector blade is displaceable by said displacement device comprise an evacuation position in which the wind deflector blade is oriented for guiding air passing thereover upwardly away from said roof opening in a front-to-rear direction; and an air delivery position in which the wind deflector blade is oriented for guiding air passing thereover in a downward direction into said roof opening; further comprising a cover which partially closes the roof opening in a closed position thereof; wherein said displacement means includes an electric drive; and wherein said electric drive is connected to a sensor means for detecting at least one of a vehicle speed parameter and an outside temperature parameter, the electric drive being operable for adjusting the position of the wind deflector blade as a function of said at least one parameter.

5. Wind deflector element according to claim 1, wherein the displacement device comprises means for changing the position of said deflector blade in response to changes in the position of the cover.

6. Wind deflector element according to claim 5, wherein the means for changing of the displacement device raises the front edge of the wind deflector blade relative to the rear edge of the wind deflector blade during an initial opening movement of the cover and increases the height of said front edge relative to the rear edge of the wind deflector blade as the opening movement of the cover continues through a predetermined range of said movement.

7. Wind deflector element according to claim 6, wherein the means for changing of the displacement device lowers the front edge of the wind deflector blade relative to the rear edge of the wind deflector blade during a second opening movement of the cover beyond said predetermined range until a fully lowered position of the front edge is produced.

8. Wind deflector element according to claim 7, wherein the front edge of the wind deflector blade is located below the rear edge of the wind deflector blade in said fully lowered position.

9. Wind deflector element according to claim 1, wherein the displacement comprises at least one pair of front and rear lifting levers which are offset relative to each other in said longitudinal direction of the roof, a rear end of each lifting lever being pivotally connected for rotation around an axis which is fixed relative to the fixed roof surface; and wherein said lifting levers are mechanically prestressed in an upward direction.

10. Wind deflector element according to claim 9, wherein a front end of the front lifting lever is guided to slide in a groove which is provided in a lateral edge of the wind deflector blade; and wherein a front end of the rear lifting lever is pivotally connected an edge of the wind deflector blade.

11. Wind deflector element according to claim 10, wherein the displacement device comprises means for changing the position of said deflector blade in response to changes in the position of the cover by a front edge of the cover or part carried thereby forming a stop for limiting upward motion of the lifting levers due to said mechanical prestressing, at least during a predetermined range of movement of the cover; and wherein the means for changing raises the front edge of the wind deflector blade relative to the rear edge of the wind deflector blade during an initial opening movement of the cover and increases the height of said front edge relative to the rear edge of the wind deflector blade as the opening movement of the cover continues through said predetermined range of movement.

12. Wind deflector element according to claim 11, wherein a mechanical stop which is connected to the fixed roof surface limits upward motion of the front lifting lever as soon as the opening movement of the cover reaches the end of said predetermined range.

13. Wind deflector element according to claim 12, wherein the means for changing lowers the front edge of the wind deflector blade relative to the rear edge of the wind deflector blade during a second opening movement of the cover beyond said predetermined range until a fully lowered position of the front edge is produced; wherein mechanical stops connected to the fixed roof surface limit upward motion of both of the lifting levers when the fully lowered position of the front edge is produced.

14. Wind deflector element according to claim 13, wherein the cover is arranged relative to said lifting levers such that a closing motion of cover causes the lifting levers to be pressed down.

15. Wind deflector element according to claim 14, wherein a pair of front and rear lifting levers is provided on each lateral side of the wind deflector blade.

16. Wind deflector element according to claim 11, wherein the cover is displaced parallel to said fixed roof surface during said opening movement of the cover.

17. Wind deflector element according to claim 1, wherein the displacement device comprises a scissor linkage connected to a front edge of the wind deflector blade in a middle section thereof and a lifting lever at each lateral side of the wind deflector blade, each lift lever being pivotally connected at one end to a respective lateral side of the wind deflector blade and at an opposite end to the fixed roof surface.

18. Wind deflector element according to claim 17, wherein scissor linkage comprises a pair of scissor rods and a threaded drive spindle on which two nuts with oppositely cut threads are disposed, each nut being pivotally connected to a lower end of a respective one of the scissor rods.

19. Wind deflector element according to claim 18, wherein the scissor arrangement has a fully raised height which is greater than the length of the lifting levers.

20. Wind deflector element according to claim 1, wherein the displacement device comprises a double hinged arrangement on each lateral side of the wind deflector blade.

21. Wind deflector element according to claim 20, wherein the double hinge arrangement comprises two lifting levers, each of which has a lower end pivotally connected to a respective base part and an upper end pivotally connected to the wind deflector blade, the pivotal connection of the upper end of one of the lifting levers being displaceable toward and away from a front edge of the wind deflector blade by being received within a slot in the wind deflector blade; wherein the base parts are relatively displaceable with respect to each other in the longitudinal direction of the roof by one of the base parts being fixed with respect to the fixed roof surface and the other of the base parts being displaceably mounted relative to the fixed roof surface; and wherein the lifting levers are joined to one another in a center section thereof in a manner permitting sliding and pivoting movements therebetween via a pivot on one of the lifting levers being received in a slot on the other of the lifting levers.

22. Wind deflector element according to claim 1, wherein said displacement means includes an electric drive.

23. Wind deflector element according to claim 1, wherein an active side of the wind deflector blade has one of a semicircular and an elliptical profile.

24. Wind deflector element according to claim 1, wherein the wind deflector blade is divided into segments, and wherein at least one of the segments is positionally adjustable relative to at least one other of the segments.

\* \* \* \* \*